United States Patent
Green et al.

(10) Patent No.: US 6,535,286 B1
(45) Date of Patent: Mar. 18, 2003

(54) POSITIONABLE MULTIPLE DETECTOR SYSTEM FOR SPECTROPHOTOMER, ELLIPSOMETER, POLARIMETER AND SYSTEMS, AND METHODOLOGY OF USE

(75) Inventors: Steven E. Green, Lincoln, NE (US); Gerald Cooney, Lincoln, NE (US)

(73) Assignee: J.A. Woollam Co. Inc., Lincoln, NE (US)

( * ) Notice: Subject to any disclaimer, the term of this patent is extended or adjusted under 35 U.S.C. 154(b) by 0 days.

(21) Appl. No.: 09/531,877

(22) Filed: Mar. 21, 2000

(51) Int. Cl.[7] .................................................. G01J 4/00
(52) U.S. Cl. ........................ 356/369; 356/367; 356/364
(58) Field of Search ................................. 356/364, 369, 356/365, 366, 367, 368; 250/225; 73/865.8

(56) References Cited

U.S. PATENT DOCUMENTS

| | | | |
|---|---|---|---|
| 1,773,436 A | 8/1930 | Rayton et al. | |
| 3,405,270 A | 10/1968 | Briggs | |
| 3,630,621 A | 12/1971 | Liskowitz | 356/104 |
| 4,242,581 A | 12/1980 | Crow | 250/227 |
| 4,938,602 A | 7/1990 | May et al. | 356/435 |
| 5,166,752 A * | 11/1992 | Spanier et al. | 356/369 |
| 5,494,829 A | 2/1996 | Sandstrom et al. | 435/518 |
| 5,706,212 A | 1/1998 | Thompson et al. | 364/525 |
| 5,757,671 A * | 5/1998 | Drevillion et al. | 250/225 |
| 5,872,630 A * | 2/1999 | Johs et al. | 250/225 |
| 5,936,734 A | 8/1999 | Johs et al. | 356/364 |
| 5,956,145 A * | 9/1999 | Green et al. | 356/364 |
| 6,084,675 A * | 7/2000 | Herzinger et al. | 356/369 |
| 6,212,961 B1 * | 4/2001 | Dvir | 73/865.8 |
| 6,278,519 B1 * | 8/2001 | Rosencwaig et al. | 250/225 |
| 6,353,477 B1 * | 3/2002 | Johs et al. | 356/369 |

* cited by examiner

Primary Examiner—Frank G. Font
Assistant Examiner—Roy M. Punnoose
(74) Attorney, Agent, or Firm—James D. Welch (57) ABSTRACT

Disclosed are spectrophotometer, polarimeter, and ellipsometer systems which have multiple easily, sequentially, positionable detector systems therein mounted to allow easy positioning thereof, to for instance, allow sequential monitoring of ellipsometric and spectrophotometric signals, without removal of any detector system from the spectrophotometer, polarimeter, or ellipsometer system. Also disclosed are methods of use wherein-different detectors in a positionable multiple detector containing system are utilized during different electromagnetic beam detection steps.

17 Claims, 5 Drawing Sheets

POSITIONABLE MULTIPLE DETECTOR SYSTEM FOR SPECTROPHOTOMER, ELLIPSOMETER, POLARIMETER AND SYSTEMS, AND METHODOLOGY OF USE

TECHNICAL AREA

The present invention relates to detector systems, and more particularly to sequentially positionable, multiple detector systems in spectrophotometer, ellipsometer and polarimeter systems. The present invention also includes methods of use wherein different detector systems are utilized during different data acquisition, system calibration and/or component alignment procedures.

BACKGROUND

Spectrophotometers are well known systems for monitoring polychromatic electromagnetic beam intensity change as function of interaction with material systems, without concern to measurement of orthogonal component magnitudes, and/or phase angle therebetween. Ellipsometer systems, on the other hand, monitor change in phase between orthogonal components in a beam of electromagnetic radiation, in combination with a change in the magnitude of a ratio of the magnitudes of the orthogonal components. It is further noted that polarimeter systems generally comprise the Polarization State Detector System portion of an Ellipsometer system and are employed to detect a partial, or full polarization state of a beam of electromagnetic radiation as can be presented by a Stokes Vector, whereas, again, ellipsometer systems are typically applied to detect change in polarization state of a beam of electromagnetic radiation as a result of interaction with a material system, which change is inherently represented by ellipsometric PSI and ellipsometric DELTA. A change in the polarization state of a beam of electromagnetic radiation which results from said interaction with a material system provides insight to characteristics of the material system.

(Note: It should be appreciated that Ellipsometry measures change in Polarization State of an Electromagnetic Beam which results from interaction with a Sample. Said change in Polarization State is generally expressed In terms of "Ellipsometric PSI" and "Ellipsometric DELTA", which are related by the well known Equation:

$$\tan(PSI)\exp(i\text{DELTA})=R_p/R_s;$$

which is often written:

$$\rho=\tan(\Psi)e^{i\Delta}=R_p/R_s$$

where $R_p$ and $R_s$ are Complex Fresnel Coefficients for the case where said Electromagnetic Beam reflects from a sample. Similar $T_p$ and $T_s$ Transmission Fresnel Coefficients apply where an Electromagnetic Beam transmits through a sample).

Conventional ellipsometer systems typically comprise a source of electromagnetic radiation, a polarization state modifier, a stage for supporting a material system to be investigated, a polarization state analyzer, and a detector system. Further, the combination of a source of electromagnetic radiation and a polarization state modifier, is often termed a Polarization State Generator System, and the combination of a polarization state analyzer and a detector system, is often termed a Polarization State Detector System, or polarimeter. In use a beam of electromagnetic radiation which is produced by the source thereof, is caused to pass through said polarization state modifier, interact with a material system which is placed on said stage for supporting a material system to be investigated, and then pass through said polarization state analyzer, then enter said detector system. (Note that said interaction with a sample system can involve reflection from and/or transmission therethrough).

It is further to be appreciated that there are many functionally different types of electromagnetic radiation detectors available, (eg. Photo-Diode, Photo-Diode Array, Charge Coupled Device (CCD), Photo Multiplier Tubes, Photo-Resistive Elements, Photo-Conductive Elements, Thermo-Piles, Bolemeters etc.), and that the present invention detector system can be configured to make a number of such functionally different types of detectors easily sequentially available in use. This is beneficial because electromagnetic radiation detectors which operate on different scientific principals provide different capabilities as regards wavelength ranges measurable and single to noise (S/N) ratios achievable etc.

With the foregoing in mind, it is disclosed that when practicing spectrophotometry, ellipsometry and/or polarimetry, it at times occurs that a detector system being utilized is inadequate to detect information present in an electromagnetic beam being intercepted. It is often necessary to remove said detector system and replace it with another of a different functional basis type. Such detector system change can be tedious, difficult and time consuming. Utility would obviously be provided by a system which enabled simply moving another detector system into position. A need is thus identified for a system which, for instance, allows a user to select and easily, sequentially, position more than one functional basis type of detector system, without removing any detector system(s).

A search of Patents produced very little. A Patent to Briggs, U.S. Pat. No. 3,405,270 describes a system containing slots which allow positioning of a source and detector relative to one another. A Patent to Rayton et al., U.S. Pat. No. 1,773,436 describes a polarization photometer system with a bracket arm rotatable secured to a post, which is used to support a table and test specimen. U.S. Pat. No. 4,242,581 to Crow, describes a system of four laser energy detectors arranged to allow simultaneous energy monitoring, which system can be easily positioned with respect to a laser beam source aperture. Patent U.S. Pat. No. 3,630,621 to Liskowitz provides a system for measurement of visibility through a fluid using polarized light wherein a source and a detector which are easily positioned with respect to one another. Other Patents identified, but not felt to be particularly relevant are U.S. Pat. No. 4,938,602 to May et al., and U.S. Pat. No. 5,494,829 to Sandstrom et al.

The present invention meets the identified need(s) in the form of providing spectrophotometer, ellipsometer and polarimeter systems which are comprised of multiple detector systems, wherein selected detector systems therein can be easily, sequentially, positioned to receive electromagnetic radiation as desired by a user during, for instance, system component alignment, actual reflection or transmission sample system investigation data acquisition, and/or during calibration data acquisition etc. procedures. The present invention finds particularly relevant application where it is desired to quickly, sequentially, acquire both spectrophotometric and ellipsometric data.

DISCLOSURE OF THE INVENTION

The primary embodiment of the present invention is an ellipsometer system, comprising:

a source system comprising:
    a source of electromagnetic radiation: and
    a polarization state modifier system:
a stage for supporting a material system;
a plurality of polarization state detector systems, each of which comprises:
    a polarization state analyzer: and
    a detector system.

During use, a beam of electromagnetic radiation is produced by said source of electromagnetic radiation and caused to pass through said polarization state modifier system, interact with a material system placed on said stage for supporting a material system, pass through a polarization state analyzer and enter a detector system in the pathway thereof. The present invention improvement is found in the mounting of said plurality of polarization state detector systems in a manner which allows easily, sequentially, placing any thereof so as to receive said beam of electromagnetic radiation, during use, without required removal of any of said polarization state detector systems from said ellipsometer system.

The present invention also includes a polarimeter system comprising a plurality of polarization state detector systems, each of which comprises:
    a polarization state analyzer: and
    a detector system.

During use, a beam of electromagnetic radiation which originates otherwise than in said polarimeter system is caused to pass through a polarization state analyzer in the pathway thereof, then enter a detector system in the pathway thereof. As in the case of the ellipsometer system, the present invention improvement is found in the mounting of said plurality of polarization state detector systems in a manner which allows easily, sequentially, placing any thereof so as to receive said beam of electromagnetic radiation, during use, without required removal of any of said polarization state detector systems from said polarimeter system.

The present invention also includes a spectrophotometer system, comprising:
    a source of electromagnetic radiation;
    a stage for supporting a material system; and
    a plurality of detector systems.

During use, a beam of electromagnetic radiation is produced by said source of electromagnetic radiation and caused to interact with a material system placed on said stage for supporting a material system, and enter a detector system in the pathway thereof. As with the ellipsometer and polarimeter systems, the present invention improvement is found in the mounting of said plurality of detector systems in a manner which allows easily, sequentially, placing any thereof so as to receive said beam of electromagnetic radiation, during use, without required removal of any said detector system from said spectrophotometer system.

In any recited present invention system embodiment, (ie. ellipsometer, polarimeter and spectrophotometer), the improvement then is found in the presence of multiple detector systems on a moveable, (eg. pivoted), arm or functional equivalent, which movable, (eg. pivoted), arm or functional equivalent allows easily positioning any of the detector systems so as to receive a beam of electromagnetic radiation during use, without the need to remove any detector system.

It is emphasized that the present invention can also provide for easy positioning of a detector system so that it receives electromagnetic radiation reflected from, or transmitted through, a material system.

A preferred embodiment of the present invention comprises at least two detector systems on a moveable, (eg. pivotal), arm or functional equivalent, which two detector systems are of different functional basis types, at least one of which is typically a member of the group:
    Photo-Diode;
    Photo-Diode Array;
    Charge Coupled Device (CCD);
    Bucket Brigade Device (BBD);
    Photo Multiplier Tube (PMT);
    Photo-Resistive Elements;
    Photo-Conductive Elements;
    Thermo-piles;
    Bolemeters.

It is to be appreciated that various type detector systems provide various intensity and/or polarization state detection capability, and that a user of the present invention can select detector systems based upon specific application needs.

A present invention system can alternatively be described as being a:
    spectrophotometer;
    ellipsometer; or
    polarimeter;
system, said system comprising:
    a polarization state detector system comprising:
        a polarization state analyzer: and
        a multiple detector system.

During use, a beam of electromagnetic radiation is caused to pass through said polarization state analyzer in the pathway thereof, then enter a detector system. Again, the present invention improvement comprises the presence of at least first and second detector systems, said first and second detector systems being mounted in a manner which allows easily, sequentially, placing any thereof so as to receive said beam of electromagnetic radiation, during use, without removal of any detector system from the spectrophotometer, ellipsometer or polarimeter being required.

A present invention system can also be described as a:
    spectrophotometer;
    ellipsometer; or
    polarimeter;
system, said system comprising:
    a polarization state detector system comprising:
        a polarization state analyzer which contains means for selecting at least one electromagnetic beam polarization state(s): and
        a detector system.

During use, a beam of electromagnetic radiation is caused to follow a path described as:
    pass through a means for selecting at least one electromagnetic beam polarization state(s) in said polarization state analyzer;
    not pass through a means for selecting at least one electromagnetic beam polarization state(s) in said polarization state analyzer; or
before entering said detector system. Again, the present invention improvement comprises a means for easily, sequentially, positioning said means for selecting at least one electromagnetic beam polarization state(s) in said polarization state analyzer. This system embodiment, it must be understood, can comprise a spectrophotometer when the means for selecting at least one electromagnetic beam polarization state(s) in said polarization state analyzer is not in the pathway of the electromagnetic beam, and can comprise a polarimeter or ellipsometer when said means for selecting at least one electromagnetic beam polarization state(s) in said polarization state analyzer is in the pathway of the electromagnetic beam.

A method of practicing ellipsometry can be described as comprising the steps of:
  a. providing an ellipsometer system as previously described:
then performing steps b. and c.:
  b. positioning one of said plurality of polarization state detector systems so as to receive electromagnetic radiation which originates at the source of electromagnetic radiation and performing an electromagnetic beam detection procedure; and
  c. positioning another of said plurality of polarization state detector systems so as to receive electromagnetic radiation which originates at the source of electromagnetic radiation and performing an electromagnetic beam detection procedure;
without the requirement that any polarization state detector system be removed from said ellipsometer system.

Another method of practicing ellipsometry can be recited as comprising the steps of:
  a. providing an ellipsometer system as previously described:
then in either order performing steps b. and c.:
  b. positioning one of said plurality of polarization state detector systems so as to receive electromagnetic radiation which originates at the source of electromagnetic radiation and transmits through said sample system, and performing a material system investigation data acquisition procedure; and
  c. positioning another of said plurality of polarization state detector systems so as to receive electromagnetic radiation which originates at the source of electromagnetic radiation and reflects from said sample system, and performing a material system investigation data acquisition procedure;
without the requirement that any polarization state detector system be removed from said ellipsometer system.

Another present invention method of practicing ellipsometry comprising the steps of:
  a. providing an ellipsometer system as previously described;
then in either order performing steps b. and c.:
  b. positioning one of said plurality of polarization state detector systems so as to receive electromagnetic radiation which originates at the source of electromagnetic radiation and transmits through or reflects from said sample system, and performing a material system investigation data acquisition procedure; and
  c. positioning another of said plurality of polarization state detector systems so as to receive electromagnetic radiation which originates at the source of electromagnetic radiation and transmits through or reflects from said sample system, and performing a material system investigation data acquisition procedure;
without the requirement that any polarization state detector system be removed from said ellipsometer system.

A present invention method of practicing spectrophotometry can be described as comprising the steps of:
  a. providing a spectrophotometer system as previously described:
then performing steps b. and c.:
  b. positioning one of said plurality of detector systems so as to receive electromagnetic radiation which originates at the source of electromagnetic radiation and performing an electromagnetic beam detection procedure; and
  c. positioning another of said plurality of detector systems so as to receive electromagnetic radiation which originates at the source of electromagnetic radiation and performing an electromagnetic beam detection procedure;
without the requirement that a detector system be removed from said spectrophotometer system.

Another present invention method of practicing spectrophotometry can be recited as comprising the steps of:
  a. providing a spectrophotometer system as previously described:
then in either order performing steps b. and c.:
  b. positioning one of said plurality of detectors so as to receive electromagnetic radiation which originates at the source of electromagnetic radiation and transmits through said sample system, and performing a material system investigation data acquisition procedure; and
  c. positioning another of said plurality of detectors so as to receive electromagnetic radiation which originates at the source of electromagnetic radiation and reflects from said sample system, and performing a material system investigation data acquisition procedure;
without the requirement that any detector system be removed from said spectrophotometer system.

Another present invention method of practicing spectrophotometry can be recited as comprising the steps of:
  a. providing a spectrophotometer system as previously described:
then in either order performing steps b. and c.:
  b. positioning one of said plurality of detectors so as to receive electromagnetic radiation which originates at the source of electromagnetic radiation and reflects from or transmits through said sample system, and performing a material system investigation data acquisition procedure; and
  c. positioning another of said plurality of detectors so as to receive electromagnetic radiation which originates at the source of electromagnetic radiation and reflects from or transmits through said sample system, and performing a material system investigation data acquisition procedure;
without the requirement that any detector system be removed from said spectrophotometer system.

A present invention method of practicing polarimetry can be recited as comprising:
  a. providing a polarimeter system as previously described;
then performing steps b. and c.:
  b. positioning one of said plurality of polarization state detector systems so as to receive electromagnetic radiation which originates otherwise and performing an electromagnetic beam detection procedure; and
  c. positioning another of said plurality of polarization state detector systems so as to receive electromagnetic radiation which originates otherwise and performing an electromagnetic beam detection procedure;
without the requirement that any polarization state detector system be removed from said polarimeter system.

Another present invention method of practicing polarimetry can be recited as comprising:
  a. providing a polarimeter system as previously described;
then in either order performing steps b. and c.:
  b. positioning one of said first and second detectors so as to receive electromagnetic radiation which originates at the source of electromagnetic radiation and transmits through said sample system, and performing a material system investigation data acquisition procedure; and c. positioning another of said first and second detectors so as to receive electromagnetic radiation which originates at the source of electromagnetic radiation and reflects from said sample system, and performing a material system investigation data acquisition procedure;

without the requirement that any polarization state detector system be removed from said polarimeter system.

Another present invention method of practicing polarimetry can be recited as comprising:

a. providing a polarimeter system as previously described; then in either order performing steps b. and c.:

b. positioning one of said first and second detectors so as to receive electromagnetic radiation which originates at the source of electromagnetic radiation and reflects from or transmits through said sample system, and performing a material system investigation data acquisition procedure; and c. positioning another of said first and second detectors so as to receive electromagnetic radiation which originates at the source of electromagnetic radiation and reflects from or transmits through said sample system, and performing a material system investigation data acquisition procedure;

without the requirement that any polarization state detector system be removed from said polarimeter system.

The present invention then includes methodology of practicing ellipsometry comprising the providing an ellipsometer system as described elsewhere herein, (wherein said ellipsometer system the improvement is found in the presence of at least a first and a second detector systems, said first and second detector systems being of different functional types), followed by the positioning of one of said multiple detector systems so as to receive electromagnetic radiation which originates at the source of electromagnetic radiation and performing an electromagnetic beam detection procedure; and further followed by the positioning another of said detector systems so as to receive electromagnetic radiation which originates at the source of electromagnetic radiation and performing another electromagnetic beam detection procedure; without the requirement that either detector system be removed from said ellipsometer system. It is noted that both detection procedures can involve electromagnetic radiation reflected from a material system, or both detection procedures can involve electromagnetic radiation transmitted through a material system, or one detection procedure can involve electromagnetic radiation reflected from a sample system, and the other detection procedure involve electromagnetic radiation transmitted through said material system. (Note, the present invention allows for utilizing the same detector system in the later case for detecting both the reflected and transmitted beams). As well, during calibrations procedures, it is further within the scope of the present invention to orient an ellipsometer system in a straight through configuration wherein an electromagnetic beam does not interact with any material system.

The present invention also includes a method of practicing polarimetry comprising providing a polarimeter system as described infra herein, (wherein said polarimeter system the improvement is found in the presence of at least a first and a second detector system, said first and second detector systems being of different functional types), followed by the positioning of one of said multiple detector systems so as to receive electromagnetic radiation which originates otherwise, and performing an electromagnetic beam detection procedure; and further followed by the positioning another of said multiple detector systems so as to receive electromagnetic radiation which originates otherwise, and performing an electromagnetic beam detection procedure without the requirement that either utilized detector system be removed from said polarimeter system.

The present invention also includes a method of practicing spectrophotometry comprising the providing a spectrophotometer system as described elsewhere herein, (wherein said spectrophotometer system the improvement is found in the presence of at least a first and a second detector system, said first and second detector systems being of different functional types). Said method continues with the positioning of one of said multiple detector systems so as to receive electromagnetic radiation which originates at the source of electromagnetic radiation and performing an electromagnetic beam detection procedure; and further continues with the positioning the another of said multiple detector systems so as to receive electromagnetic radiation which originates at the source of electromagnetic radiation and performing another electromagnetic beam detection procedure; without the requirement that either detector system be removed from said spectrophotometer system. As in the case of ellipsometry, where calibration procedures are involved, it is further within the scope of the present invention to orient an spectrophotometer system in a straight through configuration wherein an electromagnetic beam does not interact with any material system.

Of course, any recited method can comprise a monitoring of spectrophotometric intensity and ellipsometric orthogonal component ratio/phase angle between orthogonal components representing signals at some point therein. That is a recited method of practicing ellipsometry can include in one step thereof, the monitoring of intensity signals, and a method of practicing spectrophotometry can include in one step thereof the monitoring of ellipsometric signals.

Again, it is noted that all detection procedures can involve electromagnetic radiation reflected from a material system, or all detection procedures can involve electromagnetic radiation transmitted through a material system, or one detection procedure can involve electromagnetic radiation reflected from a material system, and another detection procedure involve electromagnetic radiation transmitted through said material system. (Note, the present invention allows for utilizing the same detector system in the later case for detecting both the reflected and transmitted beams, as well as using different detector systems, and similar or different apertures can be applied to the various cases).

Of course, whereas in the foregoing, at least first and second detector systems are required, more than two detector systems can be present within the scope of the present invention. And, it is important to understand that the present invention allows easy, sequential, switching between ellipsometer and spectrophotometer related detector systems.

It is also to be understood that a common detector can be rigidly mounted in a present invention system, with a polarization state analyzer system being present and mounted to allow easy movement thereof into and out of a beam of electromagnetic radiation. Particularly where a detector system is expensive, this can be a beneficial cost reducing approach.

Further, for emphasis it is directly stated that combination analyzer-detector systems, or just analyzer systems, (with an in-common detector system remaining in place), can be sequentially positioned in the present invention to receive electromagnetic radiation.

The present invention will be better understood by reference to the Detailed Description Section in conjunction with the Drawings.

SUMMARY OF THE INVENTION

It is therefore an object and/or purpose of the present invention to provide a spectrophotometer, ellipsometer or polarimeter system, which comprises multiple, sequentially positionable, detector systems.

It is another object and/or purpose of the present invention to provide a spectrophotometer, ellipsometer or polarimeter system which enables easy, sequential, positioning of a plurality of detector systems therewithin to receive electromagnetic radiation from a source thereof, without the requirement that any detector system be removed from the spectrophotometer, ellipsometer or polarimeter system.

It is another object and/or purpose yet of the present invention to provide a user of a present invention spectrophotometer, ellipsometer or polarimeter system with the ability to easily position a detector system therewithin, so as to receive electromagnetic radiation from a source thereof in said ellipsometer, polarimeter or spectrophotometer system, without the requirement that any said detector system be removed from the spectrophotometer, ellipsometer or polarimeter system.

It is yet another object and/or purpose of the present invention to provide a spectrophotometer, ellipsometer or polarimeter system which allows easy sequentially application of, for instance, photo-diode, photo-diode array, charge-coupled-device, photo-multiplier tubes, photo-resistive elements, photo-conductive elements, thermo-piles and bolemeters etc. detector systems.

It is another object and/or objective yet of the present invention to provide a spectrophotometer, ellipsometer or polarimeter system, wherein a polarization state analyzer system can be easily, sequentially, positioned with respect thereto such that a beam of electromagnetic radiation does or does not pass therethrough in use prior to entering a detector system.

It is yet another object and/or objective of the present invention to provide a spectrophotometer, ellipsometer or polarimeter system, where a common polarization state analyzer system can be utilized with a sequential plurality of easily, sequentially, positionable detector systems.

Other objects and/or purposes of the present invention will become apparent upon reading the Specification.

DETAILED DESCRIPTION

Figure 1:
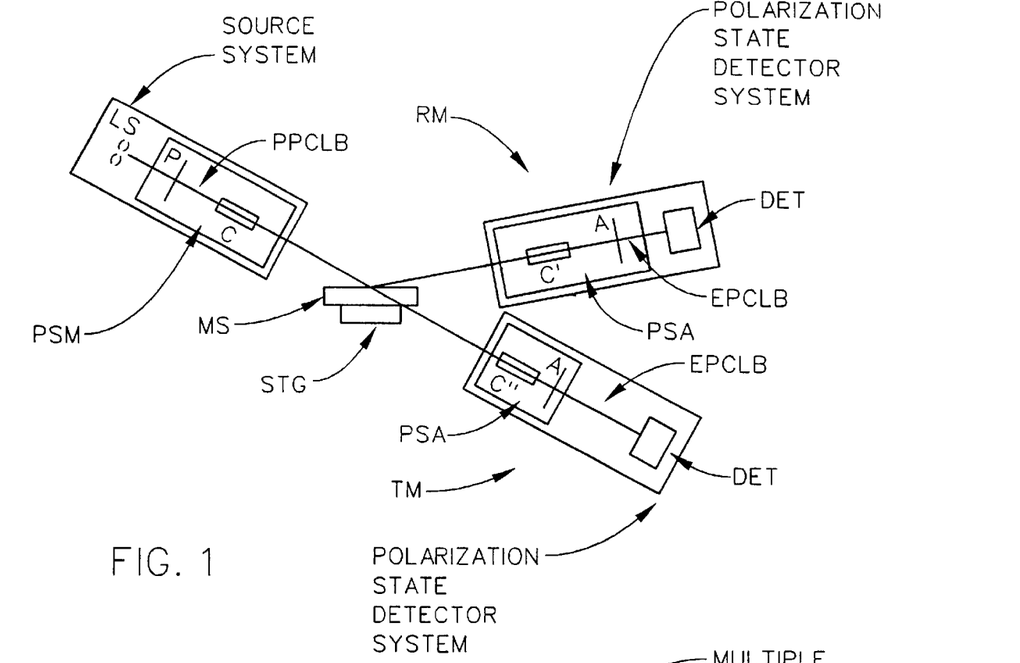
FIG. 1 in conjunction with explanation in the text, demonstrates a spectrophotometer, ellipsometer and polarimeter system.

Turning to FIG. 1, there is shown a diagram of an ellipsometer/polarimeter system for use in both reflection (RF) and transmission (TM) modes. A source of monochromatic or polychromatic electromagnetic radiation (LS) is shown to, via polarization state modifier (PSM), which is demonstrated as being comprised of an Polarizer (P) and optionally a Compensator (C), provide a polarized beam of electromagnetic radiation (PPCLB) which is directed to interact with a material system (MS) which is placed on a stage (STG). (Note that conventional terminology identifies a SOURCE SYSTEM as a combination of said source of monochromatic or polychromatic electromagnetic radiation (LS) and a Polarization State Modifier (PSM), which Polarization State Modifier (PSM) is demonstrated as being comprised of a Polarizer (P) and optionally a Compensator (C)). After interaction with the material system (MS), propagated electromagnetic beam (PPCLB) emerges as (EPCLB), passes through a polarization state analyzer (PSA) and enters a detector system (DET). (Note that conventional terminology provides that for each of the Reflection (RM) and Transmission (TM) Modes, a Polarization State Analyzer (PSA) is demonstrated as being comprised of an Analyzer (A) and optionally a Compensator (C') or (C") respectively, and that when said Polarization State Analyzer (PSA) is combined with a Detector System (DET), there is formed a Reflection or Transmission Mode Polarization State Detector System, respectively). It is also to be understood that if the Polarization State Modifier (PSM), and Polarization State Analyzer (PSA) are not present, then FIG. 1 demonstrates a Spectrophotometer system comprised of (LS), (STG/(MS) and (DET). It is to be understood that the angle of incidence of the electromagnetic beam (PPCLB) is often oriented closer to normal to the material sample (MS) upper surface, when the system is operated as a Spectrophotometer. With regard to the present invention, it is to be appreciated that the Detector System(s) (DET) indicated are multiple detector systems mounted on a positionable means (eg. a movable arm), thereby allowing easy alternate positioning of the Detector Systems in at least two locations. Note that such a rotation would be in a vertically oriented plane, as shown in FIG. 1, but that this is only demonstrative and in any embodiment of the present invention multiple detector system, motion in any plane is within the scope of the claims, (eg. see FIGS. 2 and 3). Note further that any functional means for modifying or analyzing a polarization state is to be considered within the scope of the exemplary polarizer/compensator, compensator/analyzer combinations demonstrated in FIG. 1.

Figure 2:
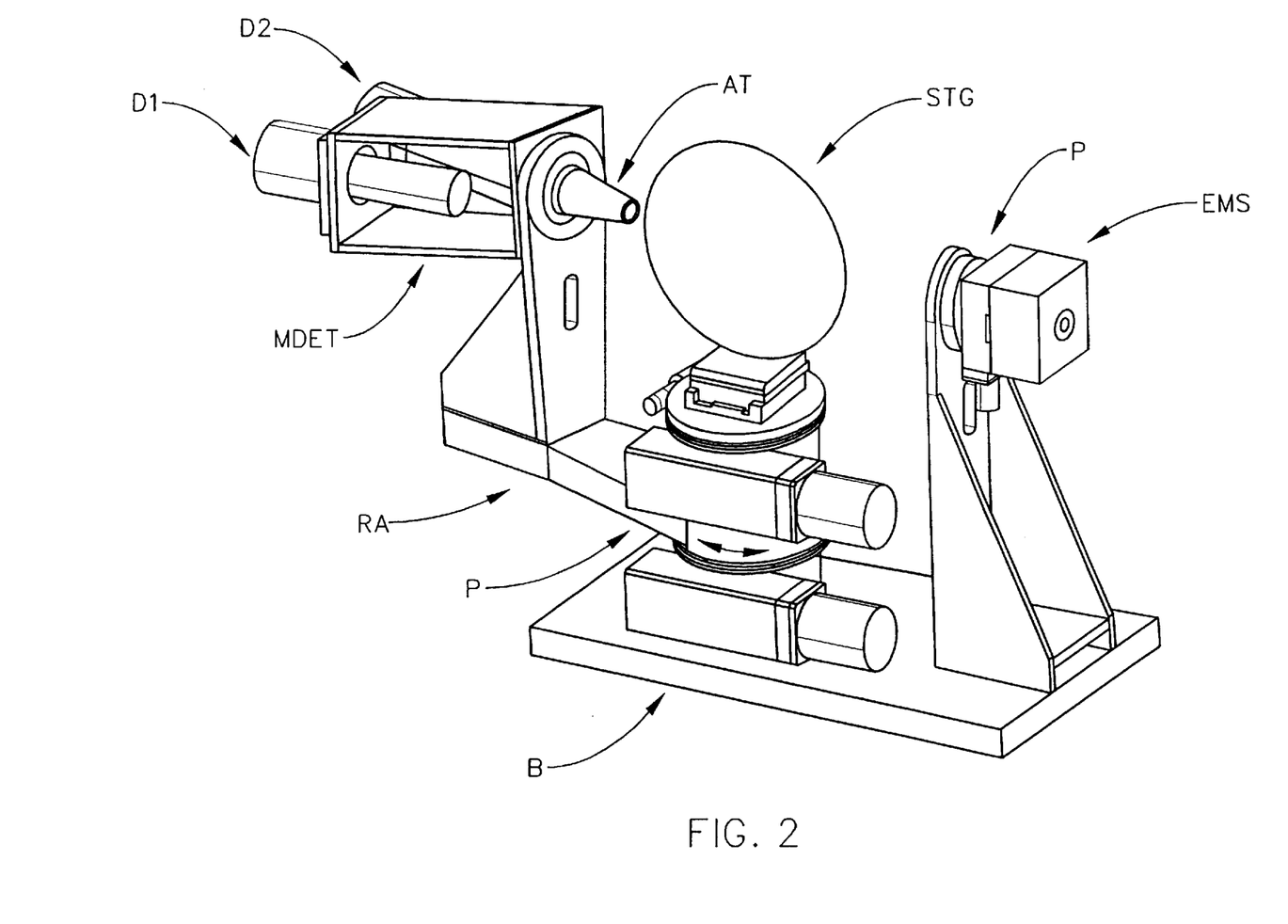
FIG. 2 shows a preferred embodiment of the present invention system, including a two detector system.

Turning now to FIG. 2, there is shown a preferred embodiment of the present invention system. Shown mounted to a common base (B), are a source of electromagnetic radiation (EMS) and a polarizer (P), a stage (STG) for supporting a material system in use, and a multiple detector system (MDET) which is comprised of two detector systems, (eg. first (D1) and second (D2) detector systems). Typically, though not necessarily, one of the first (D1) and second (D2) detector systems will be appropriate for detecting ellipsometric signals, and one for detecting spectrophotometric signals.

Note that both first (D1) and second (D2) detector systems are mounted to rotatable arm (RA), and that rotatable arm (RA) is rotatable about a pivot point (P). In use it is easy for a user to, directly or via an automation system, rotate either the first (D1) or second (D2) detector system into place, while performing, for instance, calibration or data acquisition, respectively. Note that the such a rotation is shown in a horizontally oriented plane, but could be oriented in a vertically oriented plane as suggested by FIG. 1. Rotation in any plane is within the scope of the present invention.

Figure 3:
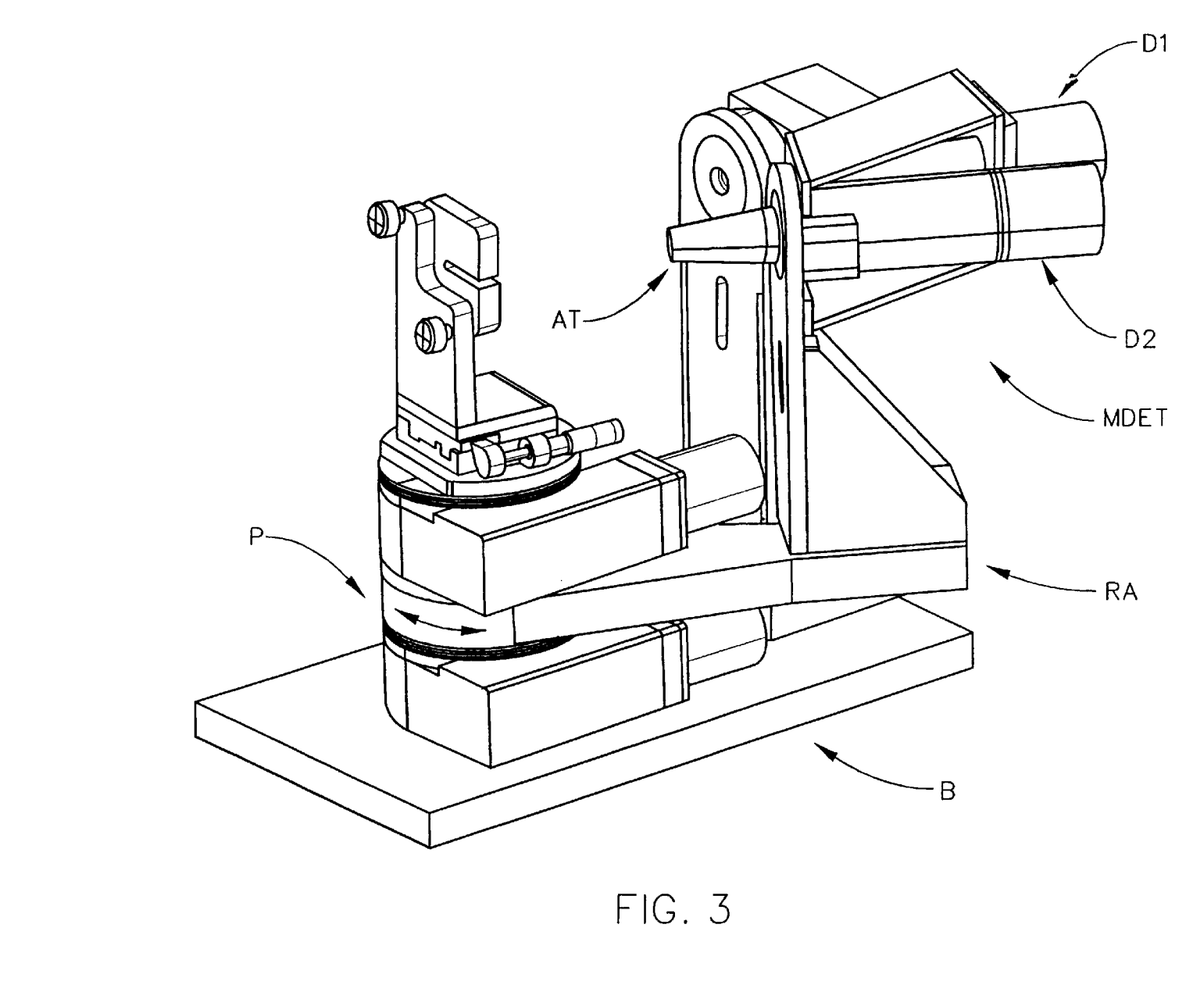
FIG. 3 shows a partial, alternative view, of the preferred embodiment of the present invention system as shown in FIG. 2, including a two detector system.

FIG. 3 shows a partial, alternative view, of the preferred embodiment of the present invention shown in FIG. 2. Functional equivalents to the geometry shown in FIGS. 2 and 3 are within the scope of the present invention.

Figure 4A:
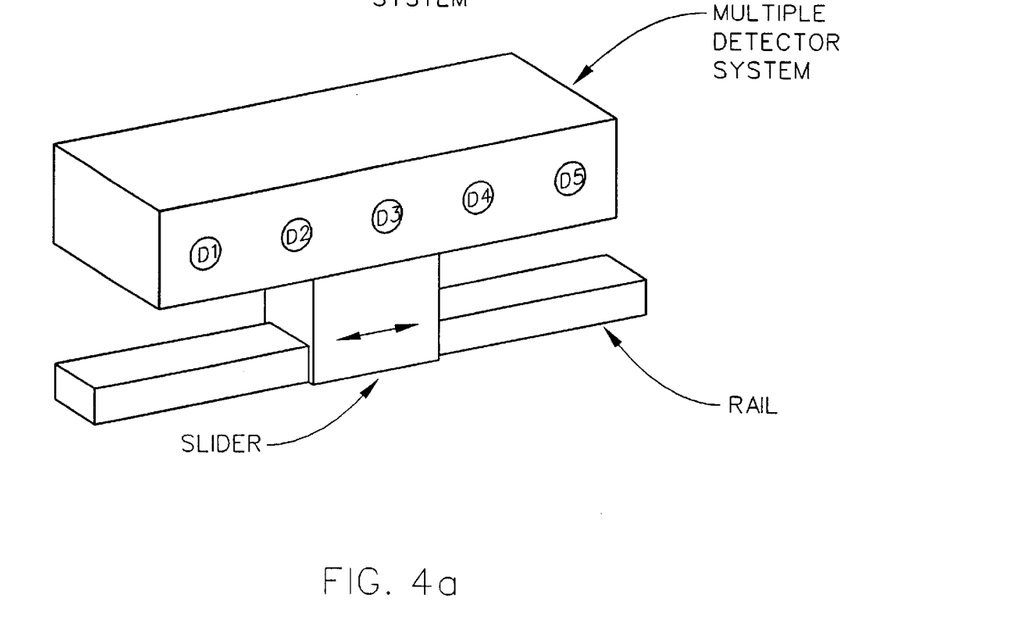
FIGS. 4a and 4b demonstrate alternative means for providing a plurality of positionable detector systems.
Figure 4B:
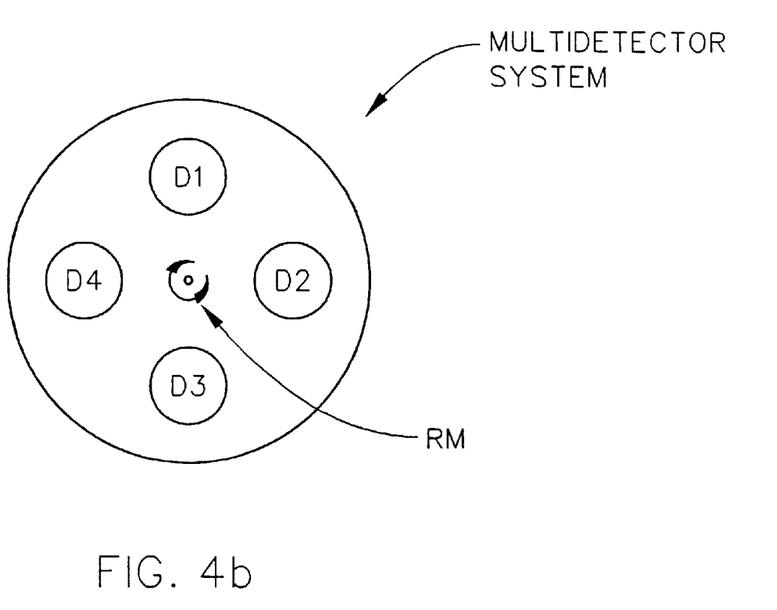
Figure 4C:
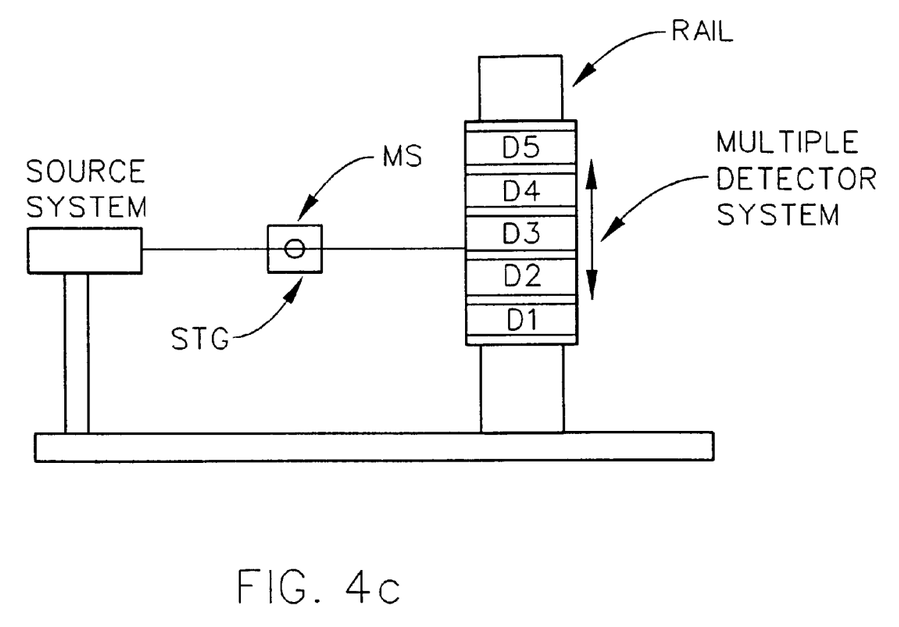
FIGS. 4c and 4d demonstrate the means for providing a plurality of positionable detector systems in FIGS. 4a and 4b as mounted in spectrophotometer, ellipsometer and polarimeter systems.
Figure 4D:
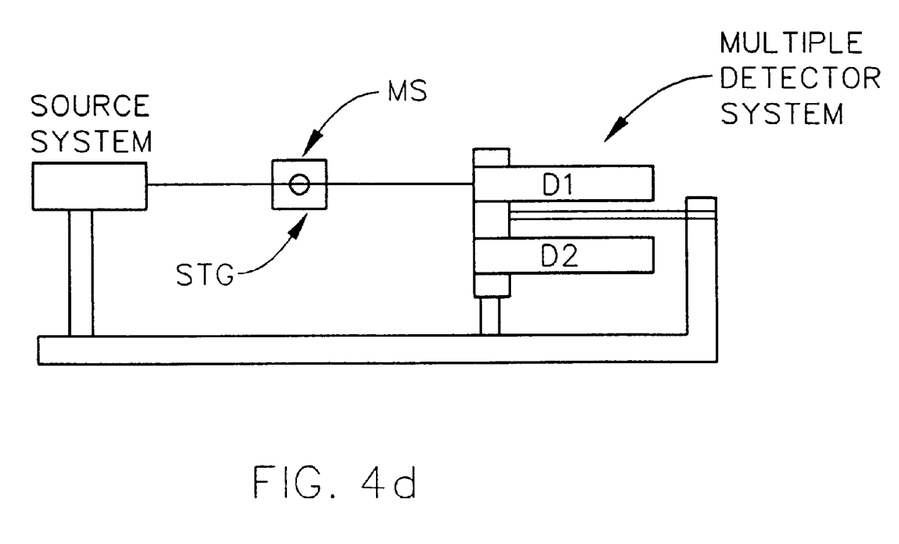

FIG. 4a demonstrates an alternative means, (linear rail and slider), for providing a plurality of positionable detector systems. Of course in a present invention system, said FIG. 4a can be oriented so that the Multiple Detector System slides horizontally or vertically or in between, with respect to an external frame of reference. FIG. 4b demonstrates a circular arrangement wherein detector systems (D1) (D2) (D3) (D4) are arranged thereon such that rotation about Rotational Mount (RM) effects positioning detector systems. It should be apparent how the systems in either FIG. 4a or 4b could be mounted in a present invention spectrophotometer, ellipsometer or polarimeter system to allow various detector systems to be positioned to receive a beam of electromagnetic radiation after it interacts with a material system, however, FIGS. 4c and 4d demonstrate the means for providing a plurality of positionable detector systems in FIGS. 4a and 4b as mounted in spectrophotometer, ellipsometer and polarimeter systems. It is to be appreciated that FIG. 4c shows the rail of FIG. 4a oriented vertically, but it could be oriented horizontally or in any other functional orientation.

Figure 5:
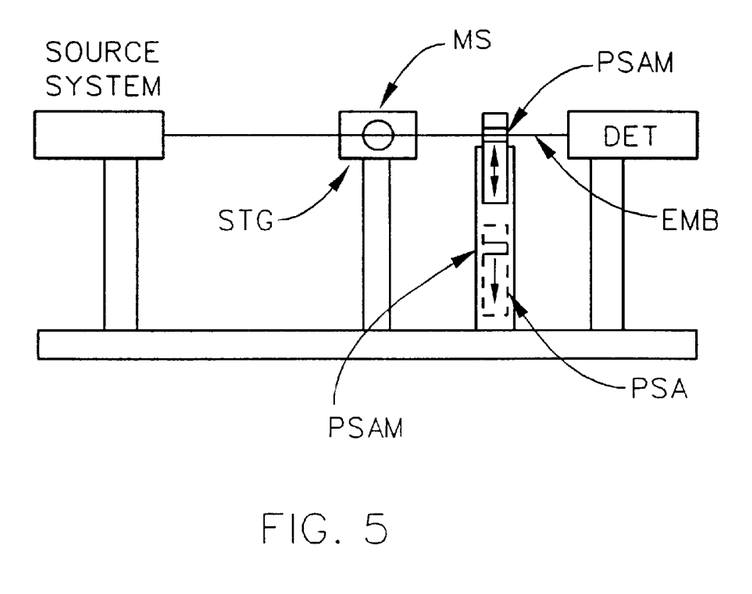
FIG. 5 demonstrates a present invention system comprising a fixed detector and a movable polarization state analyzer system is present.

FIG. 5 shows a modified present invention system, wherein a single detector system (DET) is present, and a polarization state analyzer system (PSA) is positioned to allow its being moved into and out of the path of an electromagnetic beam (EMB) which is shown entering the detector system (DET) so as to position a polarization state affecting means (PSAM) of said polarization state analyzer into and out of a path of said electromagnetic beam (EMB). In this variation of the present invention system, the same detector system (DET) is utilized in monitoring both spectrophotometer and ellipsometer signals. (Note, that the source system would be typically be configured to provide essentially unpolarized electromagnetic radiation where the polarization state analyzer system (PSA) in caused to be out of the pathway of the electromagnetic beam (EMB), and to provide polarized electromagnetic radiation where the polarization state analyzer system (PSA) in caused to position said polarization state affecting means (PSAM) thereof, in the pathway of the electromagnetic beam (EMB)). While a vertically mounted FIG. 4a-type slider mechanism is shown applied in FIG. 5, it is to be understood that a FIG. 4b rotational system, or any functional system for moving a polarization state affecting means (PSAM) of the polarization state analyzer system (PSA), selectively into, and out of, a beam of electromagnetic radiation (EMB) which enters the detector (DET) could be utilized and be within the scope of the claims.

It is to be understood in passing that aperture attachment (AT) need not be present on either detector (D1) or (D2), and the Drawings are to be broadly interpreted to indicate that the shown detectors (D1) and (D2) can be of different functional basis types, (eg. each separately selected from the group consisting of, for instance, photo-diode, photo-diode array, charge-coupled-device, photo multiplier tubes, photo-resistive elements, photo-conductive elements, thermo-piles, bolemeters etc.), the purpose being to provide easy accessibility to detectors which can monitor ellipsometric and spectrophotometer signals. (While not a major attribute, said aperture (AT) can be beneficially applied in controlling the amount of signal allowed to enter a detector system).

It is also to be understood that the while positionable aspect of the present invention detectors can be achieved via the pivot means specifically shown in the drawings, it can also be achieved by any functionally equivalent means and remain within the scope of the claims. This includes, but is not limited to means for allowing linear translation, such as a sequence of detectors slideably mounted along a track, and rotational positioning means.

For clarity, directly following, various terminology as utilized in this Disclosure and claims is defined:

A spectrophotometer system, comprises:
   a source of electromagnetic radiation;
   a stage for supporting a material system; and
   a detector system;
such that, during use, a beam of electromagnetic radiation is produced by said source of electromagnetic radiation and caused to interact with a material system placed on said stage for supporting a material system, and then enter said detector system.

An ellipsometer system comprises:
   a source system polarization state generator comprising:
      a source of electromagnetic radiation: and
      a polarization state modifier; and
   a stage for supporting a material system;
   a polarization state detector system comprising;
      a polarization state analyzer; and
      a detector system;
such that, during use, a beam of electromagnetic radiation is produced by said source of electromagnetic radiation and caused to pass through said polarization state modifier, interact with a sample system placed on said stage for supporting a material system, pass through said polarization state analyzer and enter said detector system.

Note, a demonstrative polarization state modifier can comprise a demonstrative polarizer and a compensator; and a demonstrative polarization state analyzer can comprise an analyzer, (similar to a linear polarizer), and an optional compensator.

A polarimeter system comprises:
   a polarization state detector system comprising:
      a polarization state analyzer; and
      a detector system;
such that, during use, a beam of electromagnetic radiation is caused to pass through said polarization state analyzer, then enter said detector system.

Note, a demonstrative polarization state analyzer can comprise an analyzer, (similar to a linear polarizer), and an optional compensator. Further, it is noted that a polarimeter system can be considered as being the polarization state detector system of an ellipsometer system.

Methods of use of the present invention were presented in the Disclosure of the Invention Section of this Specification.

Finally, it is to be understood that manual or automated, (eg. computer driven positioning of detector systems based on wavelength content of an electromagnetic radiation beam being utilized), control of detector system positioning is within the scope of the present invention.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the claims.

We claim:

1. A polarimeter system comprising a plurality of polarization state detector systems, each of which comprises:
   a polarization state analyzer: and
   a detector system;
   such that a beam of electromagnetic radiation is caused to pass through a polarization state analyzer in the pathway thereof, then enter a detector system in the pathway thereof;
   wherein the improvement is the mounting of said plurality of polarization state detector systems in a manner which allows easily, sequentially, via mechanical motion, placing a first and then a second thereof so as to receive said beam of electromagnetic radiation, without required removal of any of said plurality of polarization state detector systems from said polarimeter system.

2. A polarimeter system as in claim 1, wherein said plurality of polarization state detector systems includes at least two different types of detector systems, at least one thereof being selected from the group consisting of:
   photo-diode;
   photo-diode array;
   charge-coupled-device;
   photo-multiplier tubes;
   photo-resistive elements;
   photo-conductive elements;
   thermo-piles;
   bolemeters; and
   having detector system distinguishing aperturing present.

3. An ellipsometer system, comprising:
   a source system comprising:
      a source of electromagnetic radiation: and
      a polarization state modifier system:
   a stage for supporting a material system;
   a plurality of polarization state detector systems, each of which comprises:
      a polarization state analyzer: and
      a detector system;
   such that a beam of electromagnetic radiation is produced by said source of electromagnetic radiation and caused to pass through said polarization state modifier system, interact with a material system placed on said stage for supporting a material system, pass through a polarization state analyzer and enter a detector system in the pathway thereof;
   wherein the improvement is the mounting of said plurality of polarization state detector systems in a manner which allows easily, sequentially, via mechanical motion, placing a first and then a second thereof so as to receive said beam of electromagnetic radiation, without required removal of any of said plurality of polarization state detector systems from said ellipsometer system.

4. An ellipsometer system as in claim 3, wherein said plurality of polarization state detector systems includes at least two different types of detector systems, at least one thereof being selected from the group consisting of:
   photo-diode;
   photo-diode array;
   charge-coupled-device;
   photo-multiplier tubes;
   photo-resistive elements;
   photo-conductive elements;
   thermo-piles;
   bolemeters; and
   having detector system distinguishing aperturing present.

5. A spectrophotometer system, comprising:
   a source of electromagnetic radiation;
   a stage for supporting a material system; and
   a plurality of detector systems;
   such that a beam of electromagnetic radiation is produced by said source of electromagnetic radiation and caused to interact with a material system placed on said stage for supporting a material system, and enter a detector system in the pathway thereof;
   wherein the improvement is the mounting of said plurality of detector systems in a manner which allows easily, sequentially, via mechanical motion, placing a first and then a second thereof so as to receive said beam of electromagnetic radiation without required removal of any of said plurality of detector systems from said spectrophotometer system.

6. A spectrophotometer system as in claim 5, wherein said plurality of detector systems includes at least two different types of detector systems, at least one thereof being selected from the group consisting of:
   photo-diode;
   photo-diode array;
   charge-coupled-device;
   photo-multiplier tubes;
   photo-resistive elements;
   photo-conductive elements;
   thermo-piles;
   bolemeters; and
   having detector system distinguishing aperturing present.

7. A method of practicing ellipsometry comprising the steps of:
   a. providing an ellipsometer system, comprising:
      a source system comprising:
         a source of electromagnetic radiation: and
         a polarization state modifier system:
      a stage for supporting a material system;
      a plurality of polarization state detector systems, each of which comprises:
         a polarization state analyzer: and
         a detector system;
      such that a beam of electromagnetic radiation is produced by said source of electromagnetic radiation and caused to pass through said polarization state modifier system, interact with a material system placed on said stage for supporting a material system, pass through a polarization state analyzer and enter a detector system in the pathway thereof;
      wherein the improvement is the mounting of said plurality of polarization state detector systems in a manner which allows easily, sequentially, via mechanical motion, placing a first and then a second thereof so as to receive said beam of electromagnetic radiation without required removal of any of said plurality of polarization state detector systems from said ellipsometer system;
   then performing steps b. and then c.:
   b. positioning one of said plurality of polarization state detector systems so as to receive electromagnetic radiation which originates at the source of electromagnetic radiation and performing an electromagnetic beam detection procedure; and c. positioning another of said plurality of polarization state detector systems so as to receive electromagnetic radiation which originates at the source of electromagnetic radiation and performing an electromagnetic beam detection procedure;

without the requirement that any utilized polarization state detector system be removed from said ellipsometer system.

8. A method of practicing spectrophotometry comprising the steps of:

a. providing a spectrophotometer system, comprising:
a source of electromagnetic radiation;
a stage for supporting a material system; and
a plurality of detector systems;
such that a beam of electromagnetic radiation is produced by said source of electromagnetic radiation and caused to interact with a material system placed on said stage for supporting a material system, and enter a detector system in the pathway thereof;
wherein the improvement is the mounting of said plurality of detector systems in a manner which allows easily, sequentially, via mechanical motion, placing one and then another thereof so as to receive said beam of electromagnetic radiation, without required removal of any of said plurality of detector systems from said spectrophotometer system;

then performing steps b. and then c.:

b. positioning one of said plurality of detector systems so as to receive electromagnetic radiation which originates at the source of electromagnetic radiation and performing an electromagnetic beam detection procedure; and c. positioning another of said plurality of detector systems so as to receive electromagnetic radiation which originates at the source of electromagnetic radiation and performing an electromagnetic beam detection procedure;

without the requirement that any utilized detector system be removed from said spectrophotometer system.

9. A method of practicing ellipsometry comprising the steps of:

a. providing an ellipsometer system, comprising:
a source system comprising:
a source of electromagnetic radiation: and
a polarization state modifier system:
a stage for supporting a material system;
a plurality of polarization state detector systems, each of which comprises:
a polarization state analyzer: and
a detector system;
such that a beam of electromagnetic radiation is produced by said source of electromagnetic radiation and caused to pass through said polarization state modifier system, interact with a material system placed on said stage for supporting a material system, pass through a polarization state analyzer and enter a detector system in the pathway thereof;
wherein the improvement is the mounting of said plurality of polarization state detector systems on a movable arm which allows easily, sequentially, via mechanical motion, placing one and then another thereof so as to receive said beam of electromagnetic radiation without required removal of any of said polarization state detector systems from said ellipsometer system;

then in either order performing steps b. and c.:

b. positioning one of said plurality of polarization state detector systems so as to receive electromagnetic radiation which originates at the source of electromagnetic radiation and transmits through said sample system, and performing a material system investigation data acquisition procedure; and c. positioning another of said plurality of polarization state detector systems so as to receive electromagnetic radiation which originates at the source of electromagnetic radiation and reflects from said sample system, and performing a material system investigation data acquisition procedure;

without the requirement that either utilized polarization state detector system be removed from said ellipsometer system.

10. A method of practicing spectrophotometry comprising the steps of:

a. providing a spectrophotometer system, comprising:
a source of electromagnetic radiation;
a stage for supporting a material system; and
a plurality of detector systems;
such that a beam of electromagnetic radiation is produced by said source of electromagnetic radiation and caused to interact with a material system placed on said stage for supporting a material system, and enter a detector system in the pathway thereof;
wherein the improvement is the presence of said multiple detector systems mounted on a movable arm which allows easily, sequentially, via mechanical motion, placing one and then another thereof, so as to receive electromagnetic radiation without required removal of any said detector system from said spectrophotometer system;

then in either order performing steps b. and c.:

b. positioning one of said plurality of detectors so as to receive electromagnetic radiation which originates at the source of electromagnetic radiation and transmits through said sample system, and performing a material system investigation data acquisition procedure; and c. positioning another of said plurality of detectors so as to receive electromagnetic radiation which originates at the source of electromagnetic radiation and reflects from said sample system, and performing a material system investigation data acquisition procedure;

without the requirement that a utilized detector system be removed from said spectrophotometer system.

11. A method of practicing ellipsometry comprising the steps of:

a. providing an ellipsometer or polarimeter system, comprising:
a source system comprising:
a source of electromagnetic radiation: and
a polarization state modifier system:
a stage for supporting a material system;
a plurality of polarization state detector systems, each of which comprises:
a polarization state analyzer: and
a detector system;
such that a beam of electromagnetic radiation is produced by said source of electromagnetic radiation and caused to pass through said polarization state modifier system, interact with a material system placed on said stage for supporting a material system, pass through a polarization state analyzer and enter a detector system in the pathway thereof;
wherein said plurality of polarization state detector systems includes at least two different types of detector systems, at least one thereof being selected from the group consisting of:
photo-diode;
photo-diode array;
charge-coupled-device;
photo-multiplier tubes;
photo-resistive elements;
photo-conductive elements;
thermo-piles;
bolemeters; and
having detector system distinguishing aperturing present;

said plurality of polarization state detector systems being present on a movable arm which allows easily, sequentially, via mechanical motion, placing one and then another of the detectors thereon so as to receive said beam of electromagnetic radiation;

then performing steps b. and then c.:

b. positioning one of said plurality of polarization state detector systems so as to receive electromagnetic radiation which originates at the source of electromagnetic radiation and performing a material system investigation data acquisition procedure; and c. positioning another of said plurality of polarization state detector systems so as to receive electromagnetic radiation which originates at the source of electromagnetic radiation and performing a second material system investigation data acquisition procedure;

without the requirement that a utilized polarization state detector system be removed from said ellipsometer or polarimeter system.

12. A method of practicing spectrophotometry comprising the steps of:

a. providing a spectrophotometer system, comprising:
a source of electromagnetic radiation;
a stage for supporting a material system; and
a plurality of detector systems;

such that a beam of electromagnetic radiation is produced by said source of electromagnetic radiation and caused to interact with a material system placed on said stage for supporting a material system, and enter a detector system in the pathway thereof;

wherein said plurality of polarization state detector systems includes at least two different types of detector systems, at least one thereof being selected from the group consisting of:
photo-diode;
photo-diode array;
charge-coupled-device;
photo-multiplier tubes;
photo-resistive elements;
photo-conductive elements;
thermo-piles;
bolemeters; and
having detector system distinguishing aperturing present;

wherein the improvement is the presence of said plurality of detector systems mounted in a manner which allows easily, sequentially, via mechanical motion, placing one and then another thereof to receive electromagnetic radiation;

then performing steps b. and then c.:

b. positioning one of said plurality of detector systems so as to receive electromagnetic radiation which originates at the source of electromagnetic radiation and performing a material system investigation data acquisition procedure; and c. positioning another of said plurality of detector systems so as to receive electromagnetic radiation which originates at the source of electromagnetic radiation and performing a second material system investigation data acquisition procedure;

without the requirement that a utilized detector system be removed from said spectrophotometer system.

13. A method of practicing polarimetry comprising:

a. providing a polarimeter system comprising a plurality of polarization state detector systems each of which comprises:
a polarization state analyzer: and
a detector system;

such that a beam of electromagnetic radiation is caused to pass through a polarization state analyzer in the pathway thereof, then enter a detector system in the pathway thereof;

wherein the improvement is the mounting of said plurality of polarization state detector systems in a manner which allows easily, sequentially, via mechanical motion, placing one and then another thereof so as to receive said beam of electromagnetic radiation without required removal of any of said polarization state detector systems from said polarimeter system;

then performing steps b. and then c.:

b. positioning one of said plurality of polarization state detector systems so as to receive electromagnetic radiation and performing an electromagnetic beam detection procedure; and c. positioning another of said plurality of polarization state detector systems so as to receive electromagnetic radiation and performing an electromagnetic beam detection procedure;

without the requirement that a utilized polarization state detector system be removed from said polarimeter system.

14. A method of practicing polarimetry comprising:

a. providing a polarimeter system comprising a first and a second polarization state detector system each of which comprises:
a polarization state analyzer: and
a detector system;

such that a beam of electromagnetic radiation is caused to pass through a polarization state analyzer in the pathway thereof, then enter a detector system in the pathway thereof;

said first and second polarization state detector systems being present on a movable arm which allows easily, sequentially, via mechanical motion, placing one and then the other of the detectors thereon so as to receive said beam of electromagnetic radiation without required removal of any of said polarization state detector systems from said polarimeter system;

then in either order performing steps b. and c.:

b. positioning one of said first and second detectors so as to receive electromagnetic radiation which transmits through said sample system, and performing a material system investigation data acquisition procedure; and c. positioning the other of said first and second detectors so as to receive electromagnetic radiation reflects from said sample system, and performing a material system investigation data acquisition procedure;

without the requirement that a utilized polarization state detector system be removed from said polarimeter system.

15. A method of practicing polarimetry comprising:

a. providing a polarimeter system comprising a plurality of polarization state detector systems each of which comprises:

a polarization state analyzer: and a detector system;

such that a beam of electromagnetic radiation is caused to pass through a polarization state analyzer in the pathway thereof, then enter a detector system in the pathway thereof;

wherein the improvement is the presence of at least a first and a second detector system in said polarization state detector system, said first and second detector systems being of different functional types, at least one of said first and second detector systems being selected from the group consisting of:

photo-diode;

photo-diode array;

charge-coupled-device;

photo-multiplier tubes;

photo-resistive elements;

photo-conductive elements;

thermo-piles;

bolemeters; and having detector system distinguishing aperturing present;

said detector systems being present mounted in a manner which allows easily, sequentially, via mechanical motion, placing any of the detector systems thereon so as to receive said beam of electromagnetic radiation without required removal of any of said polarization state detector systems from said polarimeter system;

then performing steps b. and then c.:

b. positioning one of said multiple detector systems so as to receive electromagnetic radiation and performing an electromagnetic beam detection procedure; and c. positioning another of said multiple detector systems so as to receive electromagnetic radiation and performing an electromagnetic beam detection procedure;

without the requirement that a utilized detector system be removed from said polarimeter system.

16. A system selected from the group consisting of:

spectrophotometer;

ellipsometer; and polarimeter;

said system comprising:

a polarization state detector system comprising:

a polarization state analyzer: and a multiple detector system;

such that a beam of electromagnetic radiation is caused to pass through said polarization state analyzer in the pathway thereof, then enter a detector system;

wherein the improvement comprises the presence of at least a first, and a second, detector system, said first and second detector systems being mounted in a manner which allows easily, sequentially, via mechanical motion, placing one and then the other thereof so as to receive said beam of electromagnetic radiation without the requirement that any detector system be removed from said spectrophotometer, ellipsometer or polarimeter system.

17. A system selected from the group consisting of:

spectrophotometer;

ellipsometer; and polarimeter;

said system comprising:

a polarization state detector system comprising:

a polarization state analyzer which contains means for selecting at least one electromagnetic beam polarization state(s): and a detector system;

such that a beam of electromagnetic radiation is caused to follow a path selected from the group consisting of:

pass through a means for selecting at least one electromagnetic beam polarization state(s) in said polarization state analyzer;

not pass through a means for selecting at least one electromagnetic beam polarization state(s) in said polarization state analyzer;

before entering said detector system;

wherein the improvement is a means for easily, sequentially, via mechanical motion, positioning said means for selecting at least one electromagnetic beam polarization state(s) in said polarization state analyzer.

* * * * *